Patented Aug. 30, 1949

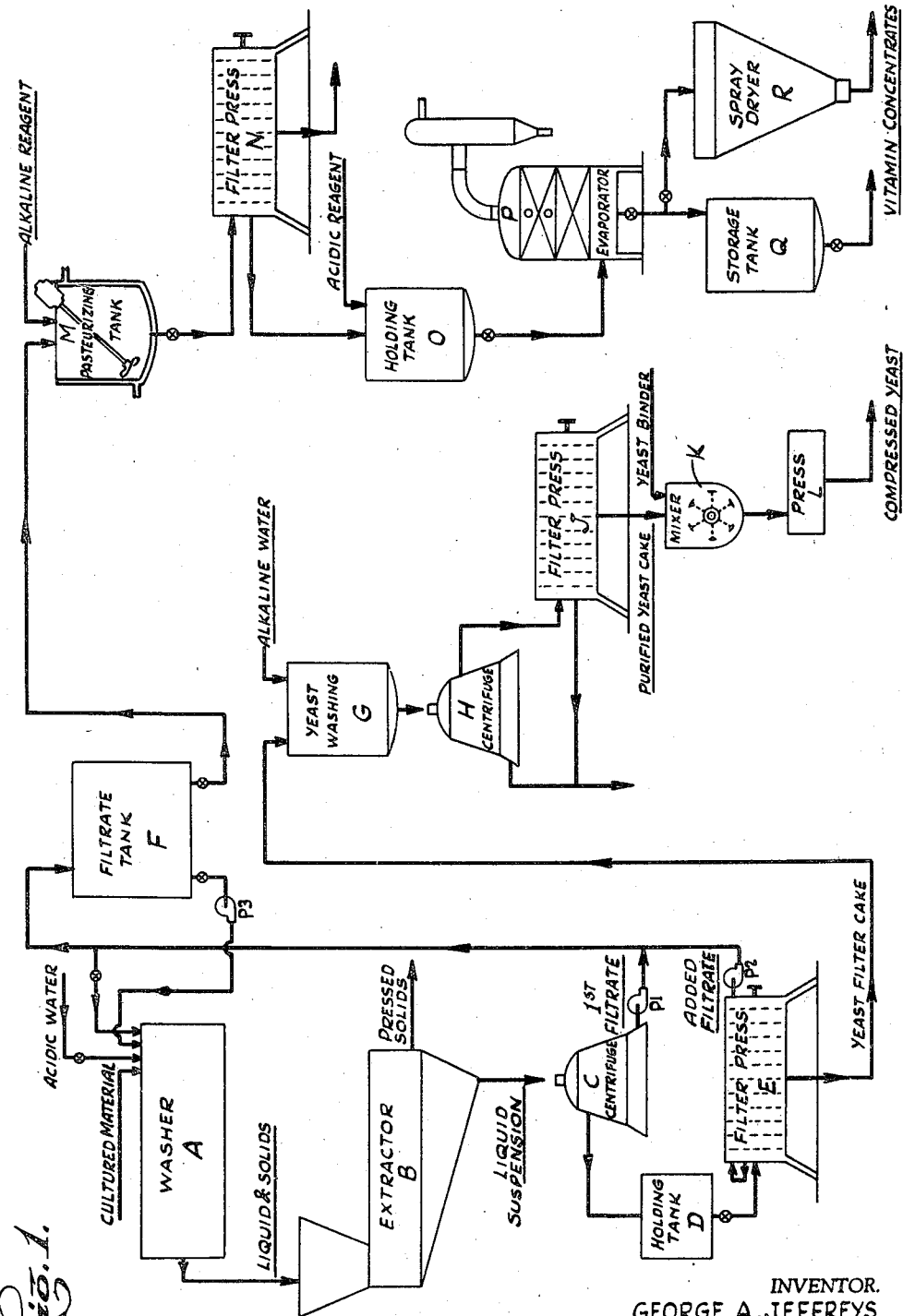

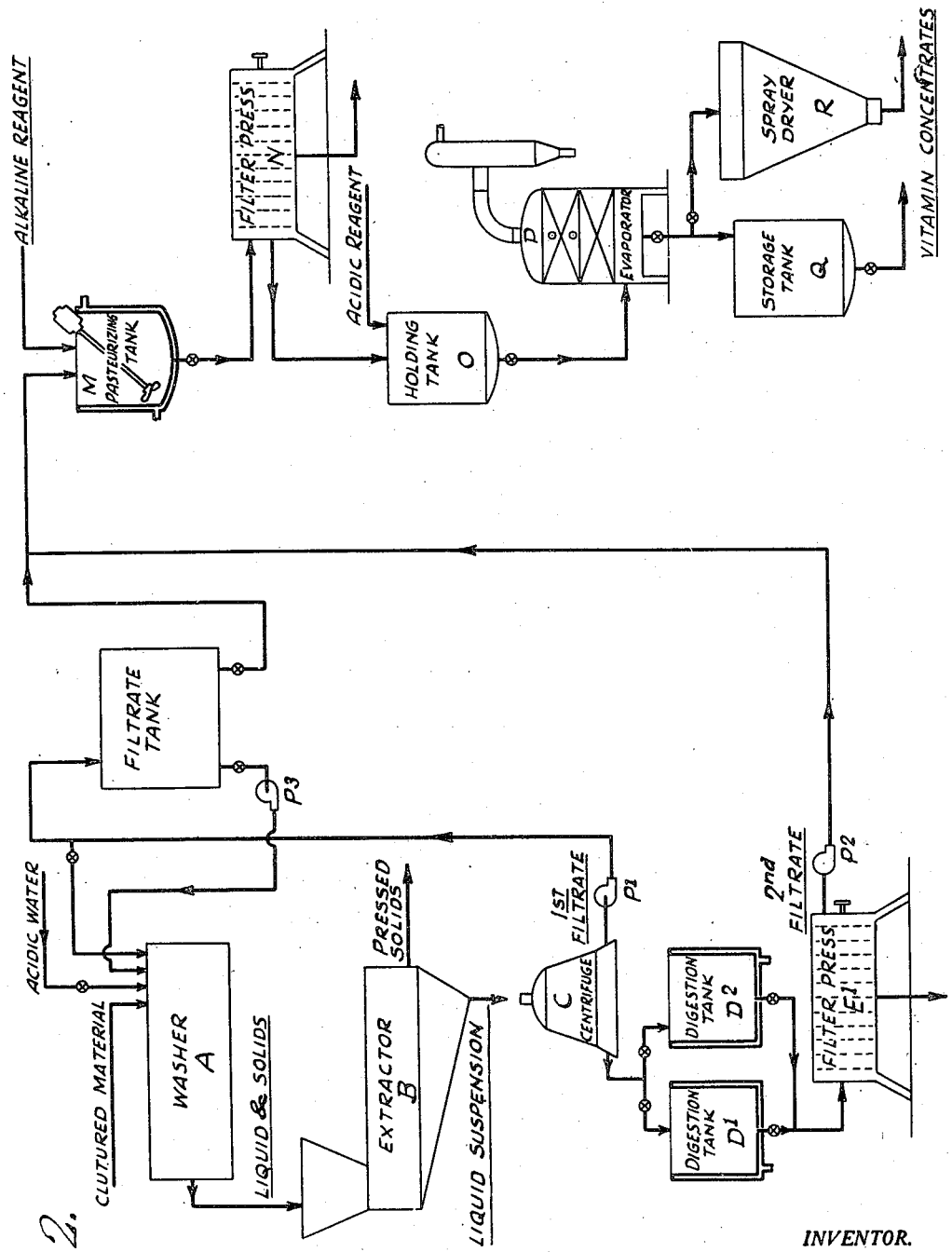

2,480,738

UNITED STATES PATENT OFFICE 2,480,738

PRODUCTION OF YEAST AND VITAMIN CONCENTRATES FROM CULTURED MATERIAL

George A. Jeffreys, Salem, Va., assignor, by direct and mesne assignments, to Nelson Littell, New Canaan, Conn.

Application November 3, 1941, Serial No. 417,710

9 Claims. (Cl. 99—97)

In my co-pending application, Serial No. 417,708, filed November 3, 1941, Patent No. 2,440,545, I have disclosed and claimed a process in which solid particles or granules of various kinds, preferably vegetable or cereal particles such as brans, soy-bean meal, malt sprouts, etc., are coated with a yeast wort, then formed into air-pervious masses and then aerated under suitable incubation conditions until a pronounced growth of yeast and of various beneficial vitamin and enzyme factors has occurred. The cultured material produced in the preferred embodiments of that process consists of cereal particles coated and impregnated with a culture exceedingly rich in yeast cells and vitamin B complex.

As disclosed in another co-pending application, Serial No. 417,709, filed November 3, 1941, Patent No. 2,440,546, a much greater increase in the development of yeast, B complex vitamins and beneficial enzymes may be obtained by growing yeast according to said process through a symbiotic action occurring in the presence of nutrient-splitting enzymes developed by growing molds.

Depending upon the substances employed and the nature and conditions of the treatments, the moist cultured material produced by said process usually contains from about 200 to about 2000 million yeast cells per gram, and on a dry basis the material assays at least about 1500 to 3000 international units of vitamin $B_1$ per pound. This represents an increase of about 100 to 400% in the vitamin $B_1$ content of the original cereal particles, and there also are corresponding developments of other vitamins of the B complex.

One of the objects of the present invention is to provide a method for treating cultured material of the types produced by the aforesaid process by which to produce valuable vitamin and enzyme concentrates as one end product and valuable compressed or dried yeast as another end product.

Another object of this invention is to provide new and efficient processes for producing liquid extracts or filtrates containing valuable concentrations of B complex vitamins and beneficial enzymes.

Another object is to provide a process for recovering most or substantially all of the vitamins and enzymes of the cultured material in a valuable liquid extract or concentrate, and also to produce degraded yeast rich in proteins as a useful by-product.

A further object hereof is to provide several new products of manufacture which are useful as food products or enriching ingredients for foods, including a new type of dried or compressed yeast that is exceedingly rich in vitamin B complex, new liquid extracts that are rich in vitamin B complex and beneficial enzymes, and new vitamin B-G concentrates produced from such extracts, in a syrupy or a solid form.

To practice the present invention, I first prepare the cultured composite material by coating suitable granular particles with a yeast wort and aerating and incubating the coated particles in air-pervious masses, according to the disclosure of either of the aforesaid co-pending applications. The granular particles preferably include particles of cereal grains, such as the brans or coating and germs of grains, which include vitamins that are synthesized and developed during the incubation. After the incubation, instead of drying or otherwise treating the cultured material so as to utilize it in its natural composite form, I subject the material to a succession of treatments which yield, according to one embodiment, compressed or dried yeast that is exceedingly rich in B complex vitamins and suitable for therapeutic, baking or other purposes, and a liquid extract or vitamin concentrates prepared from such extract which have a high content of such vitamins and may also contain valuable enzymes extracted from the cultured material. According to another embodiment, the treatments are modified so as to recover in such a liquid extract most of the vitamins which otherwise would be retained by the yeast, in which case the extract and any concentrates prepared therefrom possess a greatly increased vitamin and enzyme potency. In such embodiments the yeast is inactivated or degraded by the extraction process, but it is rich in proteins and so may be recovered and utilized as a valuable by-product.

Pursuant hereto, the cultured material produced by the culturing process is first washed with an aqueous liquid so as to remove or extract the culture from the solid particles. In this way I produce a wash liquid which contains yeast in suspension and vitamins, enzymes, fermentation sugars and other water-soluble constituents of the cultured material in solution. This liquid may be separated from the washed solids, as by straining it and pressing the solids. The strained liquid is then treated in a centrifuge, or otherwise, so as to separate it into a first filtrate and a concentrated suspension or cream containing the yeast cells and the vitamins and enzymes carried by the yeast. The filtrate from this separation contains a minor proportion of the vitamins from the cultured material, while most of the vitamins remain with the yeast.

According to one embodiment hereof, the suspension so produced may be filtered or otherwise treated to separate the yeast from the remaining liquid, after which the yeast may be purified in any suitable manner and then compressed or dried to obtain yeast exceedingly rich in B complex vitamins, as one end product. The yeast filtrate is similar to the first filtrate and may be combined therewith and utilized as such, or the total filtrate preferably is recirculated and reused for the washing of incoming cultured material until it becomes more concentrated in vitamins and enzymes, after which it is purified, pasteurized, and concentrated by evaporation under reduced pressure, so as to produce, as a second end product, syrupy or solid concentrates rich in B complex vitamins and valuable enzymes.

According to a second embodiment hereof, when it is desired to recover most or practically all of the vitamins and enzymes in extracts or concentrates substantially free from yeast, the cream yeast obtained from the first filtrate separation may be digested by the action of heat and proteolytic enzymes so as to extract the vitamin $B_1$ and other vitamins from the yeast cells into the suspending liquid. This degrades the yeast cells, rendering them inactive. After this digestion, the resulting mixture may be filtered so as to obtain a liquid extract or filtrate containing most of the vitamins formerly carried by the yeast, and also a filter cake or residue of degraded yeast. This vitamin-rich extract may be used as such, or it may be purified, pasteurized and further concentrated to a syrupy or a solid form, as in the case of the filtrate produced according to the embodiment first described. The solid residue from the filter press is a valuable source of protein and may be used in various ways, such as in animal feeds.

In any embodiment hereof the process preferably is carried out through the stage of the cream yeast and first filtrate separation so that the excess or recovered filtrate will constantly contain enough vitamins and other beneficial factors to be utilized as such or converted efficiently into more concentrated products. To this end, the process is usually started with acidic water as the aqueous washing liquid, and when a filtrate has been produced the filtrate is continually recirculated and employed for washing further material, instead of water, until accumulations of vitamins, sugars and other factors in the filtrate have increased its density or concentration to the desired extent. When that condition has been reached, I continue to recirculate and reuse a large portion of the filtrate as the major constituent of the liquid used for washing further cultured material, but with this filtrate portion there is combined a certain amount of water. The amount of water is that which will make up a filtrate of substantially the desired concentration with the vitamins and other factors to be extracted from the cultured material, the water and the filtrate portion together supplying the total volume of liquid required for proper washing results. The excess of filtrate that is not used for washing therefore represents the net liquid product or extract obtained from the yeast separation. Once suitable operating conditions have been established, this process may be carried on continuously, producing a filtrate of substantially uniform quality and comparatively high concentration as long as the operating conditions remain substantially uniform.

The pressed granular material from which the culture has been washed and extracted may be reused for further culturing operations, if desired, according to the processes disclosed in my co-pending applications. When a residue of degraded yeast is obtained, after a digestion of cream yeast, this residue may be combined with the pressed material and recultured therewith to obtain composite animal foods especially rich in proteins. The present invention therefore provides for the efficient utilization of all parts of the composite cultured material entering the process.

The foregoing and other features of my invention and suitable manners of practicing the same will be further apparent from the following more detailed description of illustrative embodiments thereof, when considered in connection with the accompanying drawings.

Figure 1 of the drawings is a flow chart which indicates diagrammatically the treatments and disposition of materials in process according to my first-described embodiment. Figure 2 is a similar flow chart illustrating a second embodiment. Units of apparatus are indicated without restriction to any particular type or number of units. The illustrated systems are adapted for continuous treatment of the cultured material, followed by treatments of the separated yeast and filtrate or filtrates, respectively, in batches.

As indicated by Figure 1 of the drawings, a stream of the cultured material is supplied to a continuous washer A, together with a stream or streams constituting the aqueous washing liquid, which should have an acidity preferably of about pH 4 to pH 5, but not exceeding about pH 5.5, in order to prevent clumping of the yeast cells or destruction of vitamins. The washer preferably is equipped with agitating paddles that mix the solids and liquid efficiently and then discharge the mixture from one end of the apparatus. The liquid is supplied at a rate suitable for efficient washing and extraction of the culture from the solid particles of the cultured material, usually at a rate of about 3 to 5 parts of liquid for each part of cultured material. A detention period of 10 to 20 minutes in the washer is satisfactory.

From the washer A a mixture of liquid and solids is discharged continuously into a strainer or extractor B, for instance, a screw press extractor such as used in the manufacture of tomato juice, having a screen of about 20 mesh. In the extractor B, the washed particles are strained from the wash liquid, and the strained particles are pressed to expel most of the liquid retained thereby. The extractor therefore discharges a stream of pressed solids and a separate liquid stream containing yeast cells in suspension and vitamins, fermentation sugars, enzymes and other soluble substances in solution.

This liquid is passed from the extractor B into a centrifuge C, which effects a preliminary separation between the yeast cells and the solution, producing a first filtrate and a cream yeast containing, for example, about 10 to 15% of solids. The sludge or cream yeast from centrifuge C may then be passed to a holding tank D and thence through a filter press E to effect a complete yeast separation. This produces a filter cake of yeast and an additional filtrate substantially like the first filtrate obtained from the centrifuge.

The first filtrate and this additional filtrate are combined to form the total filtrate or liquid extract, which contains part of the vitamins and other soluble factors derived from the cultured material. This may be subjected to further treatments for the preparation of vitamin B concentrates, in the manner hereinafter described.

The yeast cake recovered from filter press E may be purified and compressed in various ways, for example, in the following manner: The cake is transferred from filter E to a washing tank G, where it is washed with slightly alkaline water at a pH of about 7.0 to 8.2. The washing water may be made alkaline by the addition of lime, milk of lime, sodium carbonate, calcium carbonate or other inorganic alkaline reagents. This washing operation re-suspends the yeast and neutralizes its excess acidity, thus improving the taste and color of the final yeast product. The suspended yeast then is separated from the wash liquid, preferably by centrifuging at H, followed by further removal of liquid, or drying, in a filter press J. The filter cake so obtained consists of purified yeast highly enriched with vitamins retained from the original culture. To prepare the yeast for commercial use, it generally is combined with a starchy binder, such as tapioca, flour, starch, etc., in a mixer K and then compressed in a yeast press L. If desired, however, the yeast cake may be further dried in known manner and utilized in uncompressed form.

Since the cultured material entering this process usually contains from 200 to 2,000 million yeast cells per gram, it will be apparent that a large production of yeast may be obtained, and in an efficient and economical manner. The yeast product is particularly valuable because of the retention therein of most of the B complex vitamins present in the original cultured material. On a dry basis, for example, the yeast product usually contains at least about 100 to 150 international units of vitamin $B_1$ per gram.

In regular practice according to the embodiment of Figure 1, the filtrates obtained from C and E conveniently are combined and passed into a filtrate tank F, from which a portion is withdrawn continuously and supplied into the washer A for use as part of the aqueous liquid in the washing of further cultured material. The remainder or excess of the filtrate flowing into tank F is accumulated and may be passed onward for further treatment as hereinafter described. For most efficient use or treatment, this filtrate should have a density of at least 4° Baumé. To secure and maintain such a concentration, I may proceed as follows: The process is started by supplying acidulated water into the washer A, say about 3 to 5 parts, by weight, of water for each part of cultured material. The water may be treated with various acidic reagents, but I prefer to use an organic acid, such as lactic or citric acid. When a filtrate is obtained from C and E, the supplying of water is discontinued, and this filtrate is passed directly into the washer and used for washing another proportionate amount of cultured material. The resulting more concentrated filtrate is again recirculated and reused for washing still another amount of cultured material, and so on, until the concentration, or density, desired for the final filtrate, say 4° to 5° Baumé, has been attained. When that point has been reached, enough of that volume of filtrate previously recirculated is substituted by fresh acidulated water to maintain the final filtrate at substantially the same concentration; in other words, a large portion of filtrate still is supplied into A, but enough water is supplied with it to form, with the substances to be extracted from the cultured material, an extract substantially corresponding to the desired final filtrate. This becomes the regular practice referred to above.

For instance, using a tank at A of 100 gallons capacity, cultured material and water may be supplied at the start in a ratio of 4 to 1 until 100 gallons, or 800 pounds, of water has been supplied to wash 200 pounds of material. The filtrate resulting from this is recirculated and used for washing another 200 pounds or so of material, and so on until about 800 pounds of cultured material has been washed with liquid containing the original 100 gallons of water. There is then obtained about 180 gallons of final filtrate at a density of about 4° to 5° Baumé, the extra 80 gallons representing accretions through the extraction of moisture and soluble substances from the cultured material. This final filtrate is passed into tank F, and pump $P^3$ is then regulated to pump about 75 gallons, or 600 pounds, of filtrate from F into washer A for each 200 pounds of cultured material supplied to the washer, about 25 gallons, or 200 pounds, of acidulated water being supplied to the washer during the same period. Thereafter the operations may progress continuously with the production of a filtrate of substantially uniform concentration and recovery in tank F of the excess of filtrate that is not required for the washing liquid. This recovered filtrate usually has a pH of about 4 to 5. It may contain, for example, about 15% of the vitamin B complex previously carried on the cultured material, together with any fermentation sugars, enzymes, and other soluble substances that may have been extracted from the cultured material during the washing operations.

The filtrate accumulated in tank F may then be purified and concentrated in the following manner:

A quantity of the filtrate is passed from tank F into a pasteurizing tank M. In tank M an inorganic substance of alkaline reaction, such as lime, milk of lime or calcium hydroxide, is added in an amount sufficient nearly to neutralize the material, bringing it to a pH of about 6.2 to 6.6. This aids in precipitating colloidal matter and other undesirable substances or impurities derived from the cultured material. The filtrate in tank M is then pasteurized, as by heating it to about 70° C. for 10 to 15 minutes. The heating should not exceed about 82° C., less vitamins be destroyed.

The pasteurized liquid is next clarified by filtration through a filter press N, after which the clear filtrate preferably is reacidified to a pH of about 5 to 5.4, in a holding tank O, by the addition of a suitable acidic reagent such as citric or lactic acid.

The liquid from tank O is then passed into an evaporator P, where it is condensed under reduced pressure at temperatures harmless to the vitamin content of the liquid. The evaporator may be a single or multiple-effect evaporator of various known types. It may be operated, for example, under a vacuum of 26 to 28 inches, so as to prevent the temperature of the filtrate exceeding about 45° C., since prolonged heating at substantially higher temperatures might damage the product.

In preparing a vitamin B concentrate in liquid form, I usually continue the evaporation until the liquid has been condensed to a specific gravity of about 20° Bé., or has been reduced to about 10 to 12% of its original volume. The concentrate is obtained in a syrupy liquid having an amber or light amber color, a pH of about 4.6 and a distinctive taste and odor. An assay of the syrup shows it to contain 20 to 56 micrograms of thiamine hydrochloride per cubic centimeter, depending upon the concentration of vitamins in the original cultured material and the number of times the filtrate was used successively in washing the culture. This concentrate may be flash pasteurized in sterile bottles at about 60° C., for about 10 minutes, which permits it to be kept indefinitely.

To prepare vitamin B concentrates in solid form, the evaporation of the clear filtrate at P may be continued until the liquid is further concentrated, say to about 30° Bé., after which the condensed liquid or syrup may be dried to a powder in a spray dryer R, or to a cake form in shallow pans under vacuum. In the latter case the dried solid or cake preferably is ground to a powder for convenient use. The solid concentrate, in powdered or other form, may be kept indefinitely in air-tight containers. It has a light amber color, is slightly hydroscopic and is highly soluble in water. It contains about twice as much vitamin $B_1$ as the above mentioned liquid concentrate, usually about 40 to 112 micrograms of thiamine hydrochloride per gram.

The second exemplary embodiment of my invention is illustrated in Figure 2 of the drawings. Here the treatments through the stage of separating cream yeast and a first filtrate at the centrifuge C may be substantially the same as in the case of the first embodiment, the first filtrate from C being recirculated and reused for washing further cultured material until it is sufficiently concentrated as before mentioned, and any excess of the first filtrate being accumulated in tank F. The cream yeast or suspension from this separation, which ordinarily will carry the major proportion, say about 85%, of the vitamin values of the cultured material, is passed into a digestion tank $D^1$ and $D^2$ and there heat treated so as to extract B complex vitamins from the yeast into the suspending liquid. This extraction occurs most efficiently upon heating the suspension in the presence of proteolytic enzymes that hasten disruption of the yeast cells. When the cultured material entering the process has been prepared in the presence of growing molds, according to the disclosure of my copending application, Serial No. 417,709, Patent No. 2,440,546, the yeast suspension itself usually contains enough proteolytic enzymes for rapid digestion. In other cases such enzymes may be added to the yeast before digestion.

Although the time and temperatures of digestion may be varied, substantially complete vitamin extraction may be obtained, for example, in about one hour by heating the mixture to about 60° C. in about 15 minutes, holding it at this point for about 30 to 45 minutes and then heating to about 90° to 100° C. Two or more digestion tanks, such as $D^1$ and $D^2$, may be provided so that one tank may receive cream or suspension from the centrifuge while the contents of another tank are being digested.

Following this digestion treatment the digested mixture is passed from $D^1$ or $D^2$ through a filter press $E^1$, from which there is obtained a filter cake or residue of degraded yeast and a second filtrate containing most of the vitamins originally carried by the cultured material. The residue is rich in proteins and may be employed for various purposes, as hereinabove described. The second filtrate is dense enough to be passed directly to the pasteurizing tank M for purification, pasteurization and subsequent treatments at N, O, P and Q or R, as in the case of the embodiment first described. A syrup produced by concentrating the second filtrate to about 10% of its original volume will contain, for example, about 100 to 300 micrograms of thiamine hydrochloride per gram; and a solid concentrate produced by further concentration will contain, for example, about 500 to 1000 micrograms of thiamine hydrochloride per gram.

Any excess of first filtrate accumulated at F may be combined with the second filtrate from $E^1$ for concentration or may be concentrated by itself in a similar manner.

As indicated hereinabove, the pressed solids recovered from the extractor B may be reused in further culturing operations, according to the disclosures of my aforesaid copending applications. Also, the filtrate accumulated in tank F may be utilized to advantage in my culturing process, as a medium for enriching such pressed solids or other granular particles in preparing them for incubation. Since the filtrate contains live bacteria and yeast cells, it should be sterilized before being so used. This may be done by adding the filtrate to the solid particles and sterilizing both together, or by sterilizing the filtrate and then using it as a base for making a yeast wort with which to coat the particles.

The dried or compressed yeast produced according to my invention finds valuable uses as a therapeutic substance for enriching bread or otherwise correcting nutritional deficiencies, or generally as a substitute for ordinary dried or compressed yeast. The cost of producing my yeast is considerably lower than that of ordinary yeast, and the product itself is exceptionally valuable for certain uses because it contains B complex vitamins in much higher concentrations than ordinary yeast.

The vitamin concentrates produced according to my invention find important and valuable fields of use for health-giving purposes, in vitamin capsules or tablets, and as fortifying and enriching ingredients for various foods, for either human or animal consumption.

While I have illustrated and described details of preferred embodiments of my invention to facilitate its practical use, it will be apparent to those skilled in the art that various additions, omissions, substitutions and other departures from the illustrative embodiments may be made in practice. I therefore desire that my invention be accorded a scope fully commensurate with its contributions to the art, as intended to be set forth in the appended claims.

I claim:

1. The method of producing a liquid extract containing vitamin B complex which comprises providing a cultured material composed of vegetative granules coated with a vitamin-rich yeast culture, washing the cultured material with an aqueous liquid so as to remove yeast and vitamins from said granules, separating the resulting liquid suspension from the washed granules and separating yeast from the liquid suspension to obtain the desired extract.

2. The method of producing vitamin-rich yeast and concentrates rich in vitamin B complex which comprises providing a cultured material composed of vegetative granules coated with a yeast culture and carrying B complex vitamins and enzymes, washing the cultured material with an aqueous liquid to remove and extract yeast, vitamins and enzymes from the granules, then separating the resulting liquid suspension from the washed granules, then separating yeast cells from the liquid suspension to obtain yeast and a liquid extract containing vitamins and enzymes, and purifying and condensing the liquid extract to obtain the desired concentrate.

3. A process for treating cultured material that consists of granular particles coated with a culture rich in yeast and vitamin B complex, which comprises washing such material with an aqueous liquid to extract the culture into the washing liquid, separating the washed particles from the resulting liquid suspension, removing liquid from said suspension to obtain a filtrate containing vitamins, and employing at least part of said filtrate as part of the aqueous liquid for washing more of such material.

4. In a process for producing a vitamin-containing liquid extract from cultured material that consists of granular particles coated with a culture rich in yeast and B complex vitamins, the steps which comprise washing a portion of the material with several times as much water to extract the culture into the water, separating the washed particles from the resulting liquid suspension, removing liquid from said suspension to obtain a filtrate containing vitamins, recirculating said filtrate, washing a further portion of the material with such filtrate in place of water and repeating all of the said operations until an extract of the desired concentration is obtained.

5. A process for producing a vitamin-containing liquid extract from cultured material consisting of granular particles coated with a culture rich in yeast and B complex vitamins, which comprises continuously washing a stream of the material with several times as much of an aqueous liquid, continuously separating the washed particles from the resulting liquid suspension, continuously removing liquid from the resulting stream of liquid suspension to obtain a filtrate containing vitamins, continuously mixing a major portion of said filtrate with a smaller portion of water and employing the resulting mixture as the aqueous liquid for washing a further portion of the material, and continuously accumulating the remainder of said filtrate as the desired extract.

6. A process for producing a vitamin-containing liquid extract from cultured material consisting of granular particles coated with a culture rich in yeast and B complex vitamins, which comprises continuously washing a stream of the material with several times as much of an aqueous liquid that contains a portion of a filtrate such as hereinafter recited and enough water to produce, with the substances to be extracted from the cultured material, a liquid extract substantially corresponding to such filtrate, continuously removing and recovering separately the washed particles and cream yeast from the resulting liquid suspension to obtain a filtrate containing vitamins, then continuously recirculating and reusing at least a major portion of said filtrate with water for further washing as aforesaid, and continuously accumulating the remainder of said filtrate as the desired extract.

7. A process for producing a vitamin-containing liquid extract from cultured material consisting of granular particles coated with a culture rich in yeast and B complex vitamins, which comprises washing such material with several times as much of an aqueous liquid that has a pH not exceeding about 5.5 and that consists mostly of a filtrate such as hereinafter recited together with enough water to produce, with substances to be extracted from the cultured material, an extract substantially corresponding to such filtrate, separating the washed particles and cream yeast from the resulting liquid suspension to obtain a filtrate containing vitamins, employing a major portion of said filtrate with acidulated water for washing further material as aforesaid, and recovering a minor portion of said filtrate as said extract.

8. A process for producing a vitamin B concentrate from cultured material consisting of granular particles coated with a culture rich in yeast and B complex vitamins, which comprises washing such material with an acidic aqueous liquid that contains a portion of a filtrate such as hereinafter recited together with enough water to produce, with substances to be extracted from the material, an extract substantially corresponding to such filtrate, removing separately the washed particles and a concentrated yeast suspension from the resulting liquid suspension to obtain a filtrate containing vitamins, employing a portion of said filtrate with acidulated water for washing further material as aforesaid, treating a remaining portion of said filtrate with an inorganic alkaline reagent to precipitate impurities, pasteurizing the same, separating the precipitate to obtain a clear sterile liquid, acidulating the clear liquid and then concentrating the same by evaporation under reduced pressure at temperatures harmless to the vitamins.

9. A process for producing vitamin-rich yeast and a vitamin concentrate from cultured material consisting of granular particles coated with a culture rich in yeast and B complex vitamins, which comprises mixing and washing a stream of such material with 3 to 5 times as much, by weight, of an aqueous liquid that has a pH not exceeding about 5.5 and that consists mostly of a filtrate such as hereinafter recited together with enough acidulated water to produce, with substance to be extracted from the material, an extract substantially corresponding to such filtrate, straining granular particles from the resulting mixture and pressing the strained solids to obtain a wash liquid containing most of the yeast and vitamins, separating yeast from said wash liquid to obtain a filtrate containing vitamins, employing a major portion of said filtrate with acidulated water for washing further material as aforesaid, treating the remainder of said filtrate with an inorganic alkaline reagent to impart thereto a pH of about 6.2 to 6.6, then pasteurizing the same at a temperature below 82° C., then filtering the pasteurized liquid to obtain a clear filtrate, then treating the clear liquid with an acidic reagent to impart thereto a pH of about 5.0 to 5.4, and then concentrating the same to the desired extent by evaporation under reduced pressure at temperatures not exceeding about 45° C.

GEORGE A. JEFFREYS.

(References on following page)

REFERENCES CITED

The following references are of record in the file of this patent:

UNITED STATES PATENTS

| Number | Name | Date |
|---|---|---|
| 1,201,062 | Lavedan | Oct. 10, 1916 |
| 1,235,198 | Gams et al. | July 31, 1917 |
| 2,031,668 | Reich | Feb. 25, 1936 |
| 2,065,332 | Kirby | Dec. 22, 1936 |
| 2,184,748 | Light | Dec. 26, 1939 |
| 2,193,876 | Maizel | Mar. 19, 1940 |
| 2,223,465 | Schultz & Frey | Dec. 3, 1940 |
| 2,223,501 | Torrington | Dec. 3, 1940 |
| 2,229,684 | Supplee | Jan. 28, 1941 |
| 2,229,876 | Smith | Jan. 28, 1941 |
| 2,235,827 | Cregor | Mar. 25, 1941 |
| 2,276,710 | Bennett | Mar. 17, 1942 |
| 2,285,465 | Schultz and Atkin | June 9, 1942 |
| 2,295,036 | Gorcica et al. | Sept. 8, 1942 |
| 2,319,831 | Torrington | Mar. 25, 1943 |

FOREIGN PATENTS

| Number | Country | Date |
|---|---|---|
| 272,447 | Great Britain | Mar. 29, 1928 |

OTHER REFERENCES

Food Manufacture, August 1943, page 262.